United States Patent [19]

von Rex et al.

[11] Patent Number: 4,617,162

[45] Date of Patent: Oct. 14, 1986

[54] FRICTION LININGS, IN PARTICULAR FOR CLUTCH FACINGS, AND METHOD FOR THEIR PRODUCTION

[75] Inventors: Wolff G. von Rex; Hans Fetzer, both of Schwäbisch Hall, Fed. Rep. of Germany

[73] Assignee: Rex Patent Graf von Rex GmbH & Co KG, Schwäbisch Hall, Fed. Rep. of Germany

[21] Appl. No.: 328,098

[22] Filed: Dec. 7, 1981

[30] Foreign Application Priority Data

Dec. 11, 1980 [DE] Fed. Rep. of Germany ....... 3046696

[51] Int. Cl.$^4$ .......................... B29C 47/00; C08J 5/14
[52] U.S. Cl. ............................. 264/176 R; 264/210.2; 264/210.5; 264/210.6; 523/149; 523/152; 523/153; 523/155; 523/156; 523/157; 523/159
[58] Field of Search ............... 523/149, 157, 159, 152, 523/156, 155, 153; 264/325, 176 R, 210.2, 210.5, 210.6

[56] References Cited

U.S. PATENT DOCUMENTS

| | | | |
|---|---|---|---|
| 1,969,041 | 8/1934 | Seabury et al. | 523/159 |
| 2,127,298 | 8/1938 | Isaacs | 523/149 |
| 2,262,733 | 11/1941 | Nan Feldt | 523/157 |
| 4,101,500 | 7/1978 | Brodsky | 523/159 |
| 4,324,706 | 4/1982 | Tabe et al. | 523/159 |

FOREIGN PATENT DOCUMENTS

| | | | |
|---|---|---|---|
| 500375 | 3/1954 | Canada | 523/159 |
| 0000840 | 2/1979 | European Pat. Off. | |

*Primary Examiner*—James Derrington
*Attorney, Agent, or Firm*—Michael J. Striker

[57] ABSTRACT

Method for the production of friction linings, in which a mixture of fibers and wetting agents with water, in a fiber:water-mixture ratio from about 1:3 to 1:7, in the presence of plastifying components, is homogenized, the so formed plastic mass is shaped into a formed body, the formed body is dried, and then strengthened and hardened under heat and pressure. According to a variation, additives are first intensively mixed in after homogenization of the mixture containing fibers, wetting agent, plastifying component and water. The plastifying component may be a pectin, a polysaccharide, a vegetable glue or a viscose solution, in particular algin or gum arabic. Moreover, the plastifying component may be a colloid, in particular an aqueous colloid. It may also be a fiber colloid. In that case, it is preferred for the fiber colloid content to be greater than about 30% by weight. The invention also includes friction linings produced according to this method, wherein the fibers have a length according to Group 3 and/or 4 (Quebec Box Test), and are distributed homogeneously throughout the friction lining. The fibers are distributed homogeneously in a matrix containing the binding agent and additive, and the matrix contains a plastifying agent.

10 Claims, No Drawings

FRICTION LININGS, IN PARTICULAR FOR CLUTCH FACINGS, AND METHOD FOR THEIR PRODUCTION

BACKGROUND OF THE INVENTION

The present invention concerns a method for the production of friction linings, in particular clutch linings, using fiber material, heat-hardenable binding agents and customary additives, shaping the mass containing such components, strengthening under heat and pressure, and curing, as well as friction linings themselves, in particular clutch facings, not only containing asbestos fibers, but also substantially free of asbestos fibers, which contain the hardened binding agents and customary additives.

Friction linings, not only brakes linings (which thus serve for the dissipation of energy), but also clutch in machine and engine construction, in particular to a great facings (which serve for the transfer of energy) are used extent within the scope of the motor vehicle industry. They mechanical strength, the friction behavior, the thermal capacity are provided for different demands, with regard to the level, the insensitivity with regard to oil, water and corroding influences, the climatic insensitivity and the like.

Friction linings, in particular clutch facings, such as clutch plates and the like, are generally constructed on the basis of yarns and/or webs, in particular of asbestos yarn and asbestos webs. The yarn or web is impregnated or treated with binding agents and aggregates, frequently with a mixture of these materials. The binding agents involved are mostly heat-hardenable phenol or cresol resins, and partly also naturally or synthetically produced lattices with the necessary vulcanization aids, catalysts, among others. Included in the customary aggregates are substances which influence the coefficient of friction and the wear behavior, organic or inorganic filler materials, such as pearl white (artificial barium sulfate), kaolin, graphite, metal oxides, asbestos powder, oils and polymerisates.

Various types of processes are known for the production of the friction linings. For example, one can so proceed that the yarn or web is brought together with a dry mixture of binding agent and aggregate, then put into suitable form and strengthened and hardened under heating and pressure. The hot extrusion temperature lies mostly within the range from 150° to 200° C., while the amount of pressure applied is usually in the range from about 17 to 25 N/mm$^2$. The pressing time is dependent upon the thickness of the friction lining, and can amount to several minutes. The hardening follows frequently at higher temperatures over a longer period of time, often up to several hours. Instead of the addition of binding agents and aggregates in solid form, it frequently follows through impregnation of the yarn or the web with a solution of heat-hardenable binding agent in an organic solvent. The customary additives and possibly adjuvants can be brought in separately or together with the solution of the binding agent, if necessary suspended therein.

With all of these known methods there are notable shortcomings. Thus, the dry method, on account of the handling of finely divided, solid materials, and the therewith connected danger of dust, is very problematical on occupational hygiene grounds. This is so in particular when the dry mixture contains fine dust-like portions of mineral fiber materials. The use of solvents indeed overcomes the danger of dust but has, however, important disadvantages of its own. On hygienic and technical safety grounds, one can not simply allow the solvent to evaporate. On account of the possible danger of explosion, and also on economical grounds, the driving off of the solvent must follow in a closed apparatus. The solvent can indeed then be condensed and subjected to a distillation for further use. Pertaining to apparatus, this manner of operation is nevertheless quite expensive, anticipating unavoidable loss of solvent. There thus still occurs ecological problems.

Attempts to use, instead of yarns and webs, aqueous fiber suspensions, in which the binding agent and other aggregates are mixed in, have likewise turned out to be unsatisfactory. The waste water resulting after passing the aqueous slurry through screens still constituted a considerable environmental burden, in particular on account of its content of phenol or cresol compounds, and could not be drained away without reworking. Apart from this, an unsatisfactory loss of binding agent and aggregates must actually be put up with.

SUMMARY OF THE INVENTION

It is therefore an object of the present invention to make available a method which allows, in a manner more simple, more economical, and free of the disadvantages of the previously known methods, for the production of friction linings of entirely satisfactory characteristics.

According to the invention, this is attained by a method for the production of friction linings, in particular clutch facings, using fibers, heat-hardenable binding agents and customary additives, forming a mass of such components under heat and pressure and hardening, thereby characterized in that one homogenizes a mixture of fibers and wetting agent with water in a fiber:water-mixture ratio from 1:3 to 1:7 in the presence of plastification-active components and, if necessary, the customary additives, pre-shaping the so formed plastic mass, drying the molded article, finally shaping and strengthening in known manner under heat and pressure, and subsequently hardening. In particular, one should therewith so proceed, that the additives are mixed in and homogenized first after homogenization of the mixture containing the fibers, wetting agents, plastifying components and water. The plastification-active agent can, according to necessity, also be added at the end of the fiber mixing As fibers for the performance of the method according to the present invention, besides asbestos fibers, in particular of Group III and/or IV (Quebec Box Test), there also may be used other mineral fibers, such as glass fibers, stone fibers, slag fibers, organic fibers, in particular refractory organic fibers, such as aramide fibers, hdrocarbon fibers or mixtures thereof. The fibers, spread substantially in irregular position over the entire cross section of the friction lining, impart to the friction linings produced according to the present invention such a great interior strength that a completely satisfactory rotational speed of breaking up is attained therewith, the content of fiber material of which lies below that previously necessary. Thus, for example, friction linings with a fiber content from 20 to 30% by weight, relative to the total weight of the friction lining, are completely satisfactory; in general, though, the fiber portion lies between 30 and 60% by weight, relative to the total weight of the friction lining. The portion of the lighter available aggregates, such as pearl white, kaolin among others, can be increased correspondingly. The excellent rotational speed of breaking up values are perhaps attributable to the homogeneous distribution of the fibers, whereas with friction linings which are formed under use of yarns or webs, there occurs on account of the gross inhomogeneities in the transition region from yarn to surrounding matrix, impact-like effects with corresponding decrease of the rotational speed of breaking up. Moreover, they possess the danger of crack formation.

With accomplishment of the method according to the present invention one finally reaches the required mixture ratio in the presence of a plastifying component. As plastifying agent, all substances displaying a flowing or pasty or plasticizing effect, or mixtures thereof, may be used, whereby it is only of importance that herewith the formation of a kneadable, spreadable or trowelable mass is made possible. As plastification substances, in particular colloids, namely aqueous colloids, have been approved, whereby entirely in general plastification components are favored which apart from this are considered as components of the friction lining, their effect however decreasing by the degree of separation or separability. Thus, namely aqueous colloid fibers are favored as plastifying components, whereby the water contained in such aqueous colloid may be added only in such amounts that the given mixture ratio is not relinquished. The content of plastifying component amounts in general to between 1 and 25% by weight, relative to the total weight of the hardened friction lining.

According to a particularly preferred embodiment, one so proceeds, by homogenizing a mixture, which contains the fibers, wetting agent and water provided for the friction lining in the mentioned mixture ratio, under intensive mixing conditions, to a fiber dispersion, to such an extent that at least about 30% by weight, relative to the total fiber content, is present as colloid fibers. The colloid fibers have a strong plastifying effect, so that a portion of the fibers necessary apart from this for the friction lining, simultaneously exerts the function of a plastifying component. This manner of operation has proven favorable in particular with asbestos fibers, e.g. the Canadian asbestos fibers 3Z or with asbestos fibers contained in mixtures. In particular, with use of mixtures with inorganic fibers such as aluminum oxide or stone fibers, one succeeds in this manner in producing asbestos fiber-poor and even asbestos fiber-free friction linings.

As plastifying component, there can also be added pectins and substances related therewith, and/or vegetable glues. Suitable examples of pectins are algin, moreover gum arabic, among others. Also viscose solutions (xanthogenates) and the like viscose preparations can be used as plastifying components.

The homogenization of the mixture containing the fibers, wetting agent, plastifying component and water succeeds through intensive mixing, in particular under use of shearing stress, for example cutting blenders among others. The remaining customary additives are preferably mixed homogeneously into this homogeneous fiber-containing mass, even if an addition at least of part of these additives, to the mixture containing fibers, wetting agent, water and plastifying component, is by all means possible already before its homogenization.

As wetting agent or tenside, preferably used are anion-active or non-ionogenic substances free of alkali salts of fatty acids, such as alkylsulfonates, arylsulfonates, alkarylsulfonates, sulfuric acid esters, e.g. sulfated oils, amides, ethers, ethylene oxide adducts, monofatty acid esters of sugar or sugar-alcohol derivatives, among others. The use of alkali salts of higher fatty acids is indeed not excluded, but has however no advantageous influence on the friction linings.

The plastic, extrudable and trowelable mass obtained after the homogenization can be brought directly into the friction lining form, and also dried as such, whereby the use of strengthening materials such as filament yarns, e.g. of kevlar, glass, among others, is not excluded. The drying temperatures lie mostly in the range from about 40° to 100° C. The drying period of the unfinished piece amounts, depending upon the drying temperature and the lining strength, mostly between about 30 minutes and several hours. It is naturally also possible to perform the drying at room temperature or only moderately increased temperature, with correspondingly increased drying time. Preferably, the preform piece is further compressed before the final drying. In such manner the rigidity of the end product is substantially increased.

The dried formed piece is then, in customary manner, if necessary after renewed preheating, to e.g. 100°–120° C., extruded and hardened at temperatures between 150° and 175° C. and pressure between 30 and 60 N/mm$^2$. There subsequently follows the after-hardening in customary manner, mostly at temperatures between 190° and 220° C., in special cases even higher, and mostly for a total time period up to 20 hours.

The obtained linings are then cut and drilled to size.

The subject of the present invention also includes friction linings with a content of asbestos fibers, hardenable plastic resin binding agents and customary additives, producible in particular according to the previously described manner of operation, whereby according to the present invention the asbestos fibers are contained in a fiber length according to Group III and/or IV (Quebec Box Test), and moreover are present to about 30% by weight of the total fibers as colloid fibers, and the fibers, including the colloid fibers, are distributed homogeneously over the entire cross section of the friction lining. It has been shown that the choice of fibers according to the present invention is according to type as well as degree of dispersion and distribution, the different criteria for the formation of a friction lining of higher quality and nevertheless easiest accessibility. Such friction linings display rotational speed of breaking up greater than 12,000°/150° C. or greater than 10,000°/250° C. (determined for lining size as follows: outer diameter 200 mm, inner diameter 130 mm, thickness 3.5 mm).

Finally, the subject of the invention includes friction linings with a substantially asbestos-free fiber content, hardenable binding agent and customary additives, producible in particular according to the previously described manner of operation, with which according to the present invention the fibers are distributed homogeneously in a matrix containing the binding agent and the additive, and the matrix contains a fiber-plastifying agent.

As plastifying agent the known inorganic or organic flowability-effecting substances can be used. With organic fibers are usable in particular pectins or related polysaccharides, vegetable glues and similar substances; with inorganic fibers the customary softening agents are usable, depending upon the actual plastic, e.g. esters among others. In addition, viscose solutions, e.g. xanthogenates, methyl cellulose, among others, are usable.

The novel features which are considered as characteristic for the present invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

14.4 g of wetting agent Supralan are dissolved in 5 times the amount of water, relative to 480 g asbestos fiber N 374-3Z. The asbestos fibers are then added. Everything is then stirred in a churn and subsequently extended in a cutter. 24 g glass fibers (short staple) and 24 g aluminum oxide fibers (short staple) are subsequently added to the fiber mash. The entire fiber material, in doughy condition, is intensively extended and mixed, through cutting, i.e. through use of shearing stress.

Thereafter, 27 g bakelite (H), 240 g barite, 240 g kaolin and 48 g plastifying agent of an alginate basis are introduced, in dry form and to some extent across a size reduction sieve, to the prepared fiber mass. The entire material is then subsequently intimately mixed in a kneader or cutting mixer, until there results a high viscosity, but plastically deformable by hand, mass.

For production of the unfinished pieces, the mass is extruded by a piston or screw press through a slot-shaped discharge opening and simultaneously put into its shape. The unfinished piece, after brief pressing of the key form, is removed very easily from the basic form and shows good unworked strength. The unfinished pieces are then dried at 60° C. The drying follows for about 4 hours. The pieces can moreover be compressed, so that finally, compact rough-pressed blocks are produced.

The production of clutch faces follows only partly in known manner, namely pre-heating of the rough-pressed pieces to 100° C., and subsequently pressing at 150°–170° C. and 60 N/mm². Thereafter follows a hardening of the linings for 4 hours at 190° C., subsequently for 10 hours at 200° C. and then 5 hours at 220° C. Then the linings are cut and drilled to size.

EXAMPLE 2

Production of Clutch Linings

Initially, 120 g fibers, namely 30 g aluminum oxide fibers, 30 g hydrocarbon fibers (6 mm), 30 g glass fibers (6 mm) and 30 g polyacrylonitrile fibers (white), half mat, 6.7 d tex 4 mm short, are mixed. 4 g wetting agent are then dissolved in 300 ml water and added. Thereafter follows an intimate mixing in a kneader (about 20 minutes).

180 g bakelite (H), 60 g barite and 60 g kaolin (together 300 g) are stirred to a paste in 200 ml water, and mixed into the fiber mass for about 10 minutes. 12 g plastifying agent based upon alginate are finally mixed in, dry. There arises a brushable and extrudable mass. The mass is then further worked up as described in Example 1.

It will be understood that each of the elements described above, or two or more together, may also find a useful application in other types of friction devices differing from the types described above.

While the invention has been illustrated and described as embodied in friction linings in particular for clutch facings, and a method for their production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;
We claim:

1. Method for the production of friction linings, using asbestos-free fiber material, heat hardenable binding agents and a plastifying agent, said plastifying agent being selected from the group of substances imparting a flowing or pasty or plasticizing effect, so as to form from said aforementioned components a kneadable spreadable trowelable mass, by extruding the mass containing such components and hardening under heat and pressure, comprising the steps of:
    providing a homogenized mixture of fibers, wetting agent, water and a plastifying agent in a fiber: water-mixture ratio from of about 1:3 to 1:7; introducing the heat-hardenable binding agent; extruding the so formed plastic mass so as to form a formed body; drying the formed body; and strengthening and hardening under heat and pressure.

2. Method according to claim 1, further comprising intensively mixing into said mixture containing fibers, wetting agent, plastifying component and water, after homogenization, the additives.

3. Method according to claim 1, wherein said plastifying component is selected from the group consisting of, pectins, polysaccharides, vegetable glues, ester softening agents and viscose solutions.

4. Method according to claim 3, wherein said pectin or polysaccharide is algin or gum arabic.

5. Method according to claim 1, wherein said plastifying component is a colloid.

6. Method according to claim 5, wherein said colloid is an aqueous colloid.

7. Method according to claim 1, wherein said plastifying component is a fiber colloid.

8. Method according to claim 1, wherein an aqueous wetting agent-containing fiber dispersion with a fiber:-water-mixture ratio from about 1:3 to 1:7 is used, which displays a fiber colloid content greater than about 30% by weight, relative to the total fiber content.

9. Method according to claim 1, wherein said wetting agent is selected from the group consisting of alkylsulfonates, arylsulfonates, alkarylsulfonates, sulfuric acid esters, amides, ethers, ethylene oxide adducts, and monofatty acid esters of sugar or sugar-alcohol derivatives.

10. Method for the production of friction linings, using asbestos-free fiber material, heat-hardenable binding agents and a plastifying agent selected from the group of substances imparting a flowing or pasty or plasticizing effect so as to form from said aforementioned components a kneadable, spreadable, trowelable mass, by extruding the mass containing such components and hardening under heat and pressure, comprising providing a homogenized dispersion of asbestos-free fibers, wetting agent and water in a fiber: water-mixture ratio from about 1:3 to about 1:7, said homogenized dispersion displaying a colloid fiber content greater than about 30% by weight, relative to the total fiber content, whereby said colloid fibers simultaneously function as plastifying component, extruding the so formed plastic mass, after introducing the heat-hardenable binding agent, to form a formed body, drying the formed body, and strengthening and hardening under heat and pressure.

* * * * *